US009719272B1

(12) United States Patent
Torsiello, Jr. et al.

(10) Patent No.: US 9,719,272 B1
(45) Date of Patent: Aug. 1, 2017

(54) STANCHION OR POST WITH A SPRING-LOADED ASSEMBLY

(71) Applicants: Joseph N. Torsiello, Jr., East Islip, NY (US); Bryan T. Torsiello, Bay Shore, NY (US)

(72) Inventors: Joseph N. Torsiello, Jr., East Islip, NY (US); Bryan T. Torsiello, Bay Shore, NY (US)

(73) Assignee: Visiontron Corporation, Hauppauge, NY (US)

( * ) Notice: Subject to any disclaimer, the term of this patent is extended or adjusted under 35 U.S.C. 154(b) by 0 days.

(21) Appl. No.: 14/749,906

(22) Filed: Jun. 25, 2015

Related U.S. Application Data

(63) Continuation of application No. 14/706,621, filed on May 7, 2015, now abandoned.

(51) Int. Cl.
*F16M 13/00* (2006.01)
*E04H 12/22* (2006.01)
*E01F 13/02* (2006.01)
*E06B 11/02* (2006.01)
*E01F 9/011* (2006.01)

(52) U.S. Cl.
CPC .......... *E04H 12/2269* (2013.01); *E01F 9/011* (2013.01); *E01F 13/022* (2013.01); *E01F 13/028* (2013.01); *E06B 11/021* (2013.01)

(58) Field of Classification Search
CPC ... E01F 13/028; E01F 13/024; E04H 12/2269
USPC ......................... 248/417, 548, 523, 511, 900
See application file for complete search history.

(56) References Cited

U.S. PATENT DOCUMENTS 1,897,676 A * 2/1933 Ries ......................... A47C 3/18 248/417
2,351,194 A * 6/1944 Carrington ............... A47C 3/18 248/162.1
2,686,027 A * 8/1954 Kelm ...................... C03B 33/06 248/523
2,724,996 A * 11/1955 O'Shei ...................... B60R 1/06 248/160
5,697,190 A * 12/1997 Scribner ............. E04H 12/2223 248/530
6,807,999 B1 * 10/2004 Bowen .................. E01F 13/028 160/24
6,959,902 B2 * 11/2005 Leahy ..................... E01F 9/631 248/530
7,849,617 B2 * 12/2010 Intagliata ................ E01F 9/629 248/160
8,613,412 B1 * 12/2013 Donaldson ................ A45F 3/44 248/156
8,966,837 B2 * 3/2015 Knudsen ................. E02D 5/226 52/165
2006/0032165 A1 * 2/2006 Griffith ................... E02D 27/42 52/298

(Continued)

*Primary Examiner* — Bradley Duckworth
(74) *Attorney, Agent, or Firm* — Vitale, Vickrey, Niro & Gasey

(57) ABSTRACT

A socket mounted post system including a post with a hollow base portion attached to a spring mechanism. The spring mechanism includes a pillar, the pillar having a finger extending from the hollow base portion. The finger is engageable with a socket that is mountable in a floor. The spring mechanism allows the post to flex angularly relative to a vertical orientation of the post.

2 Claims, 12 Drawing Sheets

(56) References Cited

U.S. PATENT DOCUMENTS

2011/0120823 A1 * 5/2011 Hansen ................. E01F 13/028
188/272

* cited by examiner

STANCHION OR POST WITH A SPRING-LOADED ASSEMBLY

This application claims priority from Continuation patent application Ser. No. 14/706,621 filed May 7, 2015

FIELD OF THE INVENTION

The present invention relates to a socket mounted post system. More specifically, the present invention is a crowd control stanchion including a spring mechanism and a miniature socket mounted post that provides for easy installation in a floor with minimal impact to the surface of the floors. The post could alternatively be used in connection with panels, railings, signage, bollards or other types of posts.

BACKGROUND OF THE INVENTION

A stanchion is a sturdy upright post that provides support for belt, rope, chain or cord that is often used for crowd control or engineering the flow of people. A stanchion system utilizes the upright post which may include a rope support at the top of the post; or, alternatively, it may include a retractable belt. The ropes, chains or retractable belts may be linked together at the stanchions to form a crowd control or crowd flow system. These crowd flow systems are called a queue or a maze. The stanchions are often not intended to be a permanent fixture, so that the post may be expediently implemented or removed, as desired. The stanchion and rope system are typically implemented to form a queue or maze for people to move through.

Typically, the post of a stanchion is typically mounted on a weighted base. There are several problems with a post that is mounted on a weighted base. First, the base often protrudes into the area of the queue or maze in which people walk—often times causing people to trip on the base. Second, the weighted base is movable. If bumped, the base along with the ropes or belts will move causing the queue to become misaligned. Movement of the post interferes with the movement of traffic through the queue. Third, the base takes up valuable floor space and often interferes with movement of carts or language through the queue. The standard base for a stanchion post has a footprint of almost one square foot which is not desirable in space-constrained areas. When several stanchions are employed, the amount of floor space dedicated to the numerous bases becomes quite significant. Fourth, the base is not aesthetically pleasing and may be considered unacceptable given the aesthetic desire of customers. The design of the weighed bases may not be preferred by the owner of the venue implementing the queue. Fifth, the post, along with the base, may be knocked over because the base is not securely mounted to the floor. Finally, since the base and post are not secured to the floor, the base and post may be picked up by a patron and used as a weapon. This is undesirable in any public forum. A typical prior art weighted base stanchion is shown in FIGS. 1(*a*) and 1(*b*).

Alternatively, the post of the stanchion may be easily removably mounted into the floor of the facility implementing the queue or maze. The floor mounted posts are commonly implemented in applications where the flow of traffic is steady or constant or where portability of the stanchions becomes impractical. The floor mounted solution is not without its own set of problems. For example, the stanchion posts must be mounted into holes in the floor of the venue which are either pre-formed or drilled into the floor after construction. The floor mounted system is not flexible or moveable. The posts can only be positioned within the pre-formed holes within a venue. Worse, the hole depth must be 6 inches or more in order to accommodate the post; and the diameter of the hole is typically 2 to 3 inches or more. The posts are also easily removable and can be used as a weapon by a customer standing in the queue. Finally, in the floor mounted system, the posts are not flexible. The post does not absorb any impact should a person run into a post, or if a piece of luggage or cart is run into a post. Another problem with the easily removeable stanchion post is that when the post is removed, there is a 3 inch diameter by 6 inch deep hole left in the floor.

What is desired, therefore, is a post which may be semi-permanently mounted within the floor of a venue without having to install the standard 3 inch by 6 inch hole deep into the floor. There is also a need for a flexible mounting system between the post and the floor which permits the post to absorb impact to the post. It is, thus, desirable to have a semi-permanent post that has minimal impact on the existing flooring of a venue. Providing a post that is easy to install and that has the ability to flex once installed into the floor is highly desirable.

SUMMARY OF THE INVENTION

Accordingly, one of the objects of the invention is to provide a post that does not have a weighted base which provides a cleaner aesthetic and further provides maximum floor space.

A further object of the invention is to eliminate a weighted base from the post to prevent luggage from rolling over the base and moving the post from its desired position.

Another object of the present invention is to provide a semi-permanent securing mechanism to affix the post to the ground which prevents the post from shifting or moving from its desired position in securing the queue or maze and thus causing disorder in the queue lines.

An alternative embodiment of the present invention is to implement a threaded member in the post such that the threaded member engages with threads with the floor to prevent unwanted removal of the post, yet are easily removable for cleaning, re-routing or other reasons for moving the post.

An object of the present invention provides for a spring mechanism that is attached to or included as part of the post to permit the post to move from its vertical position when the post is secured to the mount in the floor. The movement may be any amount, but in situations where there may be an abundance of people, the post may move from the vertical position. The flexibility of the spring mechanism absorbs any impact forces impaired upon the post which can cause an anchor or threaded member to fail.

A further object of the present invention is the use of two interfering tabs which allow for approximately 350 degree adjustment, yet ensure the tension in the spring and securement into the socket to remain intact. This is important for queue posts because the belts must align in some undetermined direction for each layout. The belts may be aligned upon installation of the post, and may be easily rotated to change the configuration of the queue.

Since there is expected movement in the post from the flex and rotational adjustment the edge of the metal posts can cause damage to floors over time. With the addition of a thick nylon wear disc or other protective cap, the floor is protected and all friction from the movement is removed allowing for a softer and smoother functioning unit.

BRIEF DESCRIPTION OF THE FIGURES

FIG. 3(*b*) is a side view of the spring loaded post mounted in the socket in the floor at a 10° tilt;

FIG. 4(*b*) is a cross-section of the floor socket;

FIG. 6(*b*) is a bottom view of a spring loaded base assembly;

FIG. 7(*b*) is a cross-section of an alternative floor socket with a flange and cap having a threaded groove.

DETAILED DESCRIPTION OF THE INVENTION

Figure 1A:
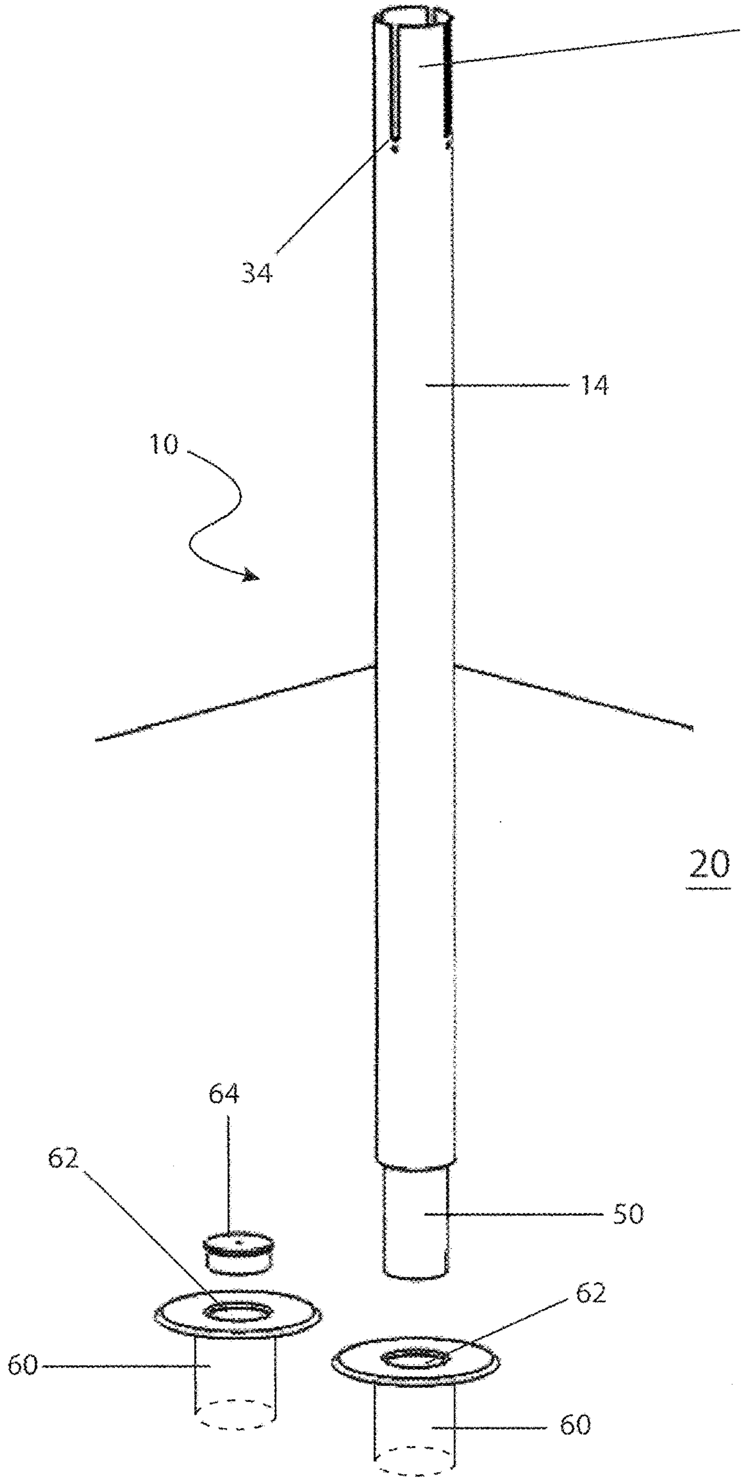
FIG. 1(a) Prior Art
FIGS. 1(*a*) and 1(*b*) are perspective views of the prior art stanchions.
Figure 1B:
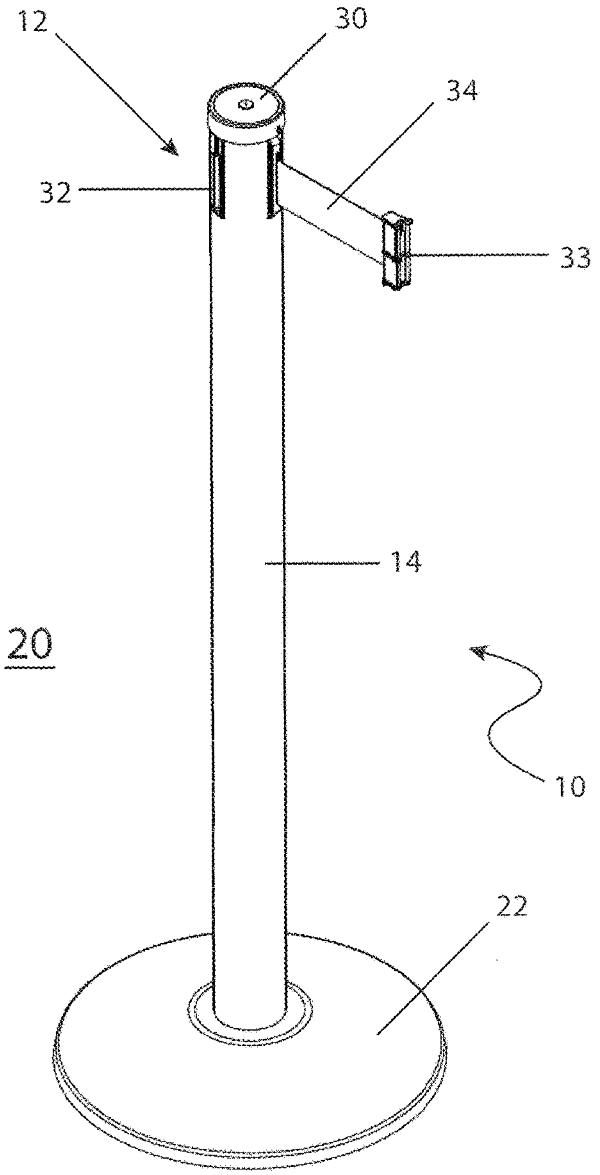
FIG. 1(b) Prior Art

FIGS. 1(*a*) and 1(*b*) depict the prior art stanchion post designs. In FIG. 1(*a*), a prior art stanchion post 10 has a top portion 12 that may include a retractable belt 34 or alternatively a standard velvet rope with hook (not shown) or a sign (not shown). The post 14 is typically of cylindrical shape, but could be any shape. The bottom portion of the post 14 includes an insert portion 50 that is approximately 3 inches in diameter and 6 inches in depth. The insert portion 50 is placed into a hole 60 in the floor 20 that is approximately 3 inches in diameter and 6 inches deep. The removable base requires a workable area of 3 inch diameter by 6 inch deep floor. The large hole poses a problem in airports or other large venues since those venues typically have thin decking that contains reinforcing members, electrical conduit, and plumbing on other items running below the surface of the floor. If the removeably mounted post option is even feasible after initial construction, contractors must carefully x-ray the floor to determine what structural supports or utilities may be located in the floor. Often the posts must be re-adjusted accordingly to the location of the utilities. If the sockets are set in the floor during initial construction, the configuration of the queue must be known at the time of construction. It is very difficult to change the configuration of the queue, once the socket is permanently mounted in the flooring.

The larger sockets have at least a 3 inch diameter raised flange which is unsightly and becomes a potential tripping hazard. Often times building owners will want the holes for the stanchions to be removed and the floors repaired, thus, adding more cost to the system.

The prior art stanchion 10 has no method of securing the insert portion 50 of the post 14 to the hole 60. There is a simple slip-fit of the insert portion 50 into the top 62 of the floor hole 60. The posts can easily be removed by unauthorized individuals. There have been times where posts have been used as weapons. The prior art systems are more prone to that risk. A cap 64 may be placed in the top 62 of the hole 60.

A second prior art embodiment is shown in FIG. 1(*b*). The prior art stanchion 10 is shown with a removable, weighted base 22 that was positioned on the floor 20. The top 12 of the post 14 may have a retractable belt member 30 that houses a retractable belt 34. The retractable belt member 30 is typically mounted at the top portion 12 of the stanchion 10 or may be inserted within the top portion 12 of the post 14. The retractable belt member 30 has a retractable belt 34 which includes a coupling 33. The retractable belt member 30 also has a receiving coupling 32 that mates with a coupling 33 of the retractable belt 34. A problem with the prior art stanchion 10 of FIG. 1(*b*) is that the weighted base 22 may move on the floor 20. Additionally, customers may trip on the weighted based 22 of the stanchion 10.

Figure 2:
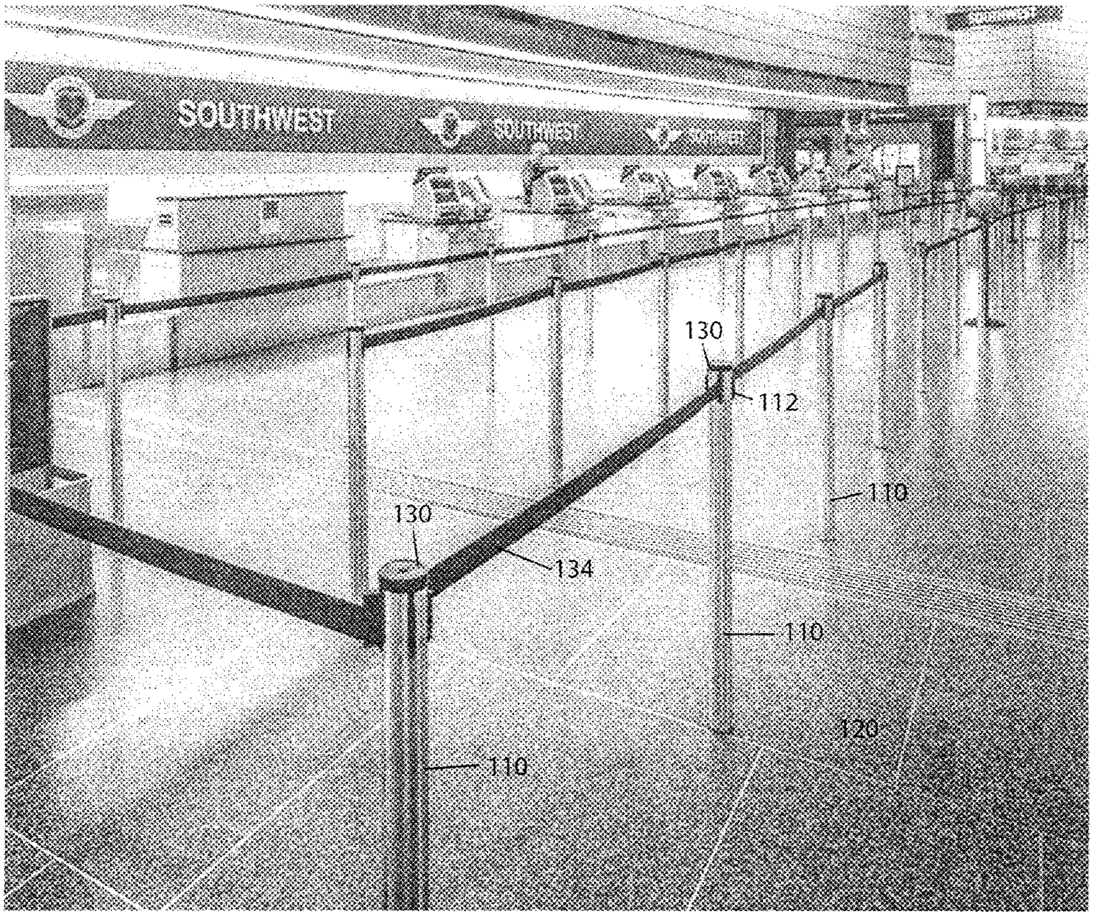
FIG. 2 is a perspective view of the stanchion system of the present invention implemented to form a queue.

FIG. 2 depicts the flexible stanchion 110 of the present invention forming a queue or a maze. The flexible stanchions 110 are mounted in the floor 120 at a predetermined distance from one another. The top 112 of the stanchion includes a retractable belt member 130. The retractable belt member 130 may have a retractable belt 134 that is 10 feet, 15 feet or 30 feet in length depending on the application. The coupling 32 of the retractable 34 may be coupled to the coupling 32 located on the retractable belt member 130. The retractable belts 134 are connected in such a fashion to form a queue.

Figure 3A:
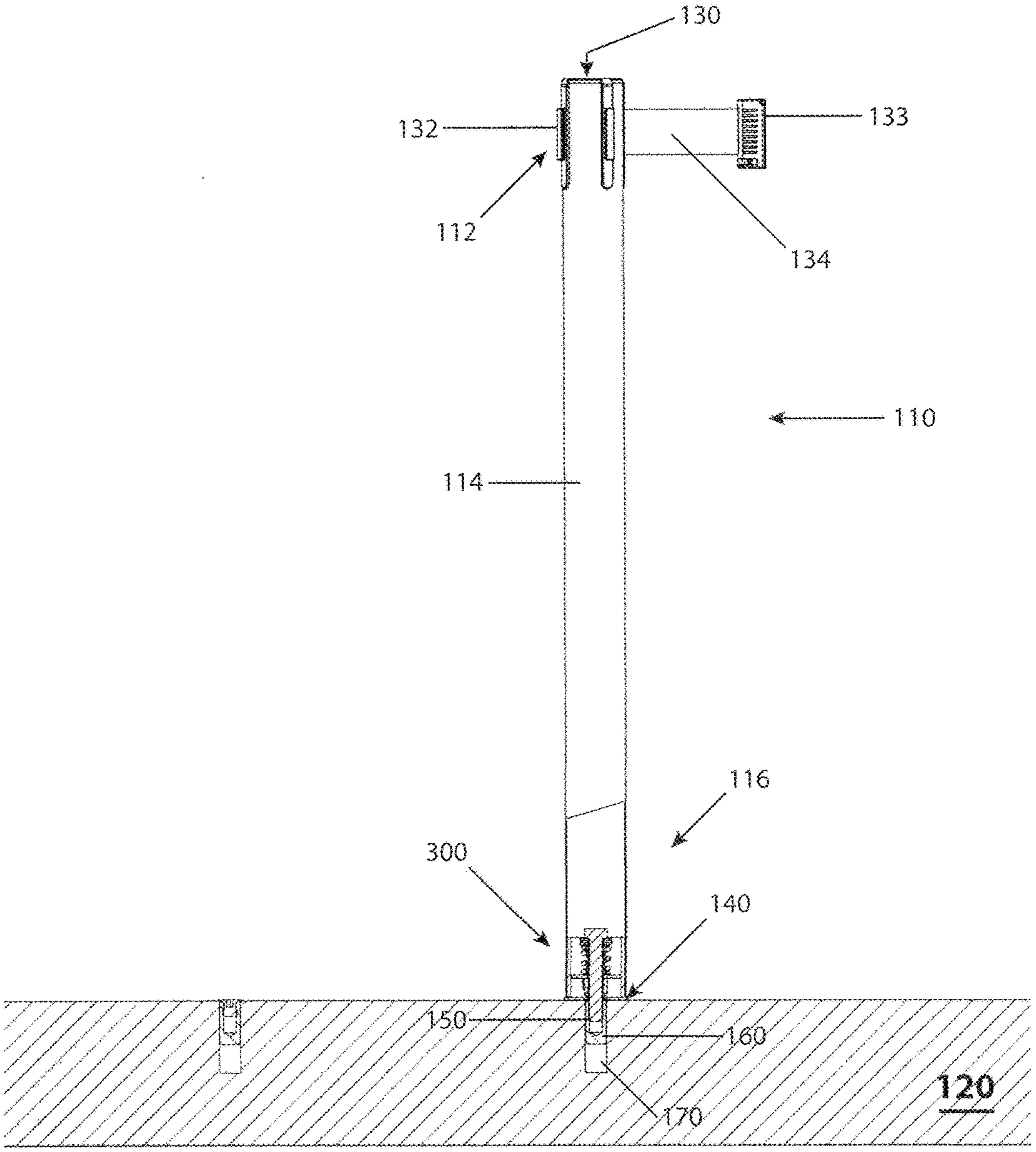
FIG. 3(*a*) is a side view of the spring loaded post mounted in the socket in the flooring.
Figure 3B:
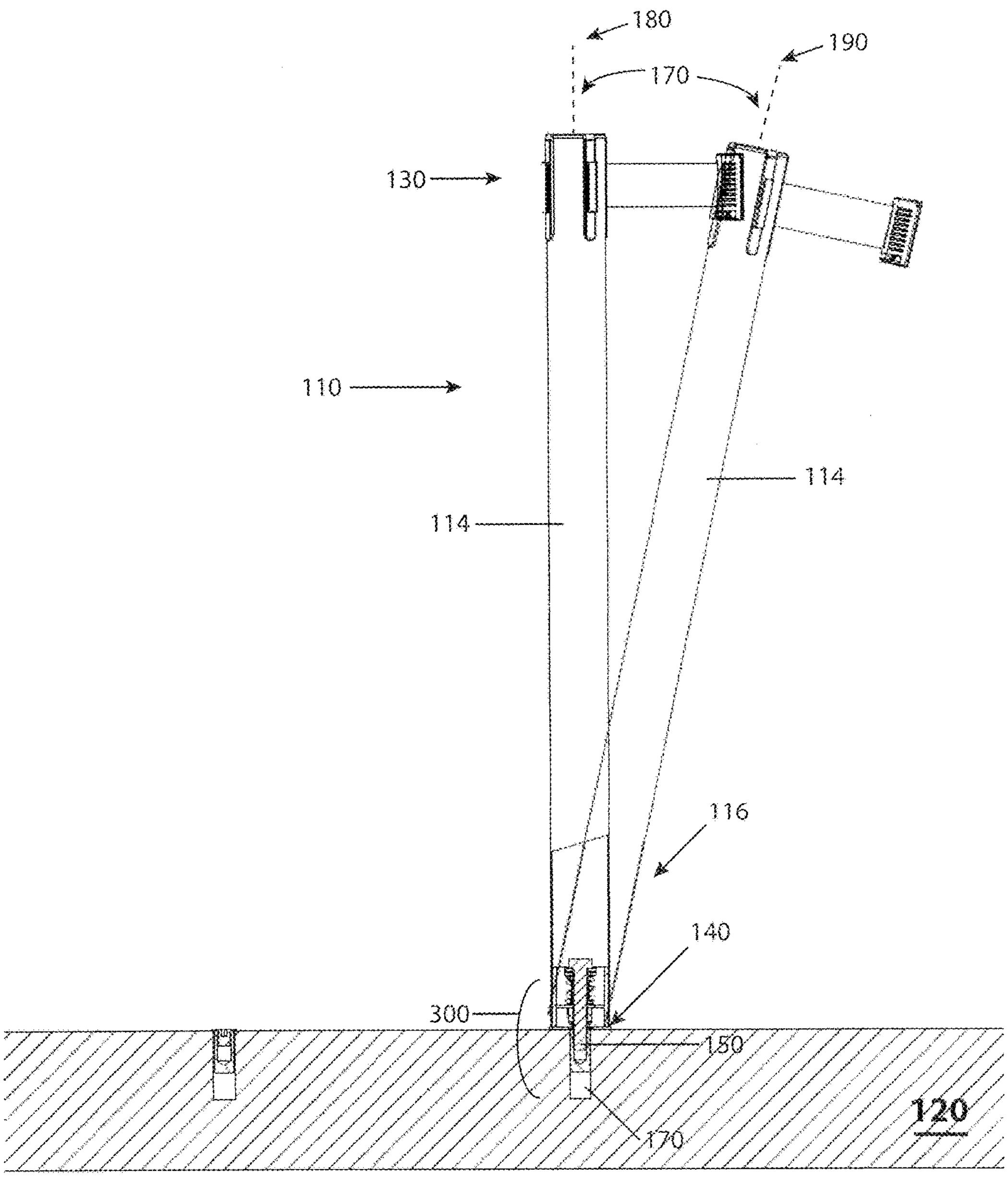

FIGS. 3(*a*) and 3(*b*) depict the flexible stanchion 110 of the present invention. The flexible stanchion 110 includes a post 114 with a top portion 112 and bottom portion 116. On the top portion 112 of the post 114 may include a retractable belt cap 130. The retractable belt cap 130 includes at least one belt 134 which is used to form a queue line. The belt 134 may be retractable into the belt cap 130. The belt 130 further has a coupling 133 at one end. The coupling of the belt 133 may be affixed to a receptacle portion 132 (or coupling) of the top portion 130 of a flexible stanchion 110. The retractable belt cap 130 is sold under the Retracta Belt® trade name. While the preferred embodiment may include a retractable belt, other types of features may be mounted to the post 114. For example, the post 114 could accommodate a standard velvet rope and classic latch mechanism. The post 114 could also accommodate either sign frame or engraved color sign, alone or in combination with the retractable belt cap 130. The system of the invention may be used for any post system such as sign posts, TV stands, airports mount TV's to show flight information, railing systems, panel systems, banner systems, any type of barrier. The description in the preferred embodiment focuses on stanchion posts. However, it is important to recognize that, while the detailed description focuses on stanchion posts, the invention may apply to any type of post.

The lower portion of the post 114 includes a spring assembly 300 and base cap 140. The spring assembly is described in more detail below with respect to FIGS. 5 and 6. The base cap 140 can be made of any rigid or semi-rigid material, but preferably is manufactured from a nylon disk. The nylon disk prevents the post from scratching the floor 120 upon installation. The base cap 140 could also include some type of non-scratch surface coating to prevent the disc from marking the floor 120.

The flexible stanchion 110 may be mounted in a wide range of floor 120 materials. As shown in FIG. 3(*b*), the flexible stanchion 110 includes a pillar 150 that protrudes from the base cap 140. The pillar 150 is inserted into a socket 160 installed in the floor 120. The pillar 150 will be described in more detail later. Referring now to FIG. 3(*b*), the pillar 150 is part of a spring mechanism 300 that permits the post 110 to move a predetermined amount form its vertical position 180 in order to absorb accidental impact caused by pedestrians or luggage. The preferred angular travel 190 of the post 114 from its vertical position is no more than 10 degrees from the vertical position 180. It must be noted that the degree of travel 170 of the post 114 is not necessarily limited to 10 degrees from the vertical position. The degree of travel could, for example, be up to 90 degrees from the vertical position 180 such that the post 114 is essentially parallel with the floor 120. The reason it may be advantageous for the post 114 to travel only 10 degrees from is to prevent accidental rebound of the post 114 to the vertical position 180. The flexibility in the post 114 prevents the accidental fracture of the flexible pillar 150 from spring mechanism of the post 114.

The post 114 is typically between 40 inches to 72 inches in height. Because of the height of the post 114, accidental contact with the flexible stanchion 110, may cause exceedingly high torsion force to be placed on the pillar 150. The pillar 150 has a smaller diameter than the post 114. As such, the torsional force placed upon the pillar 150 can overcome the shear strength of the pillar 150 material causing the pillar 150 to structurally fail. In some instances, any more than 10 degrees of travel may cause the post 114 to snap back to the vertical position 170 and injure a person.

Figure 4A:
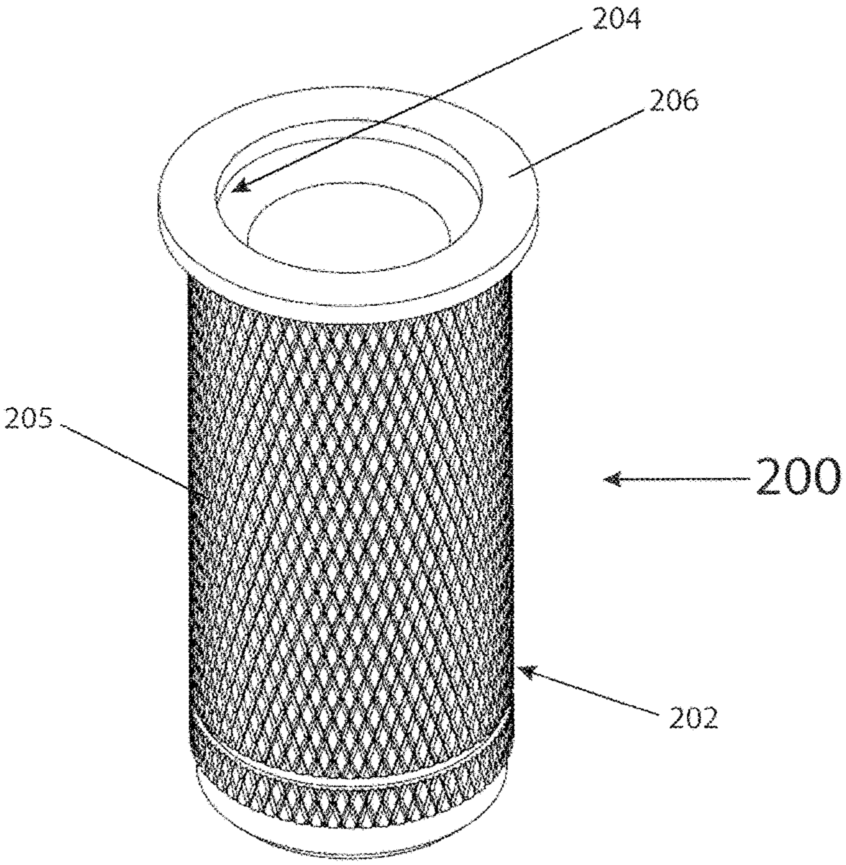
FIG. 4(*a*) is a perspective view of the floor socket.
Figure 4B:
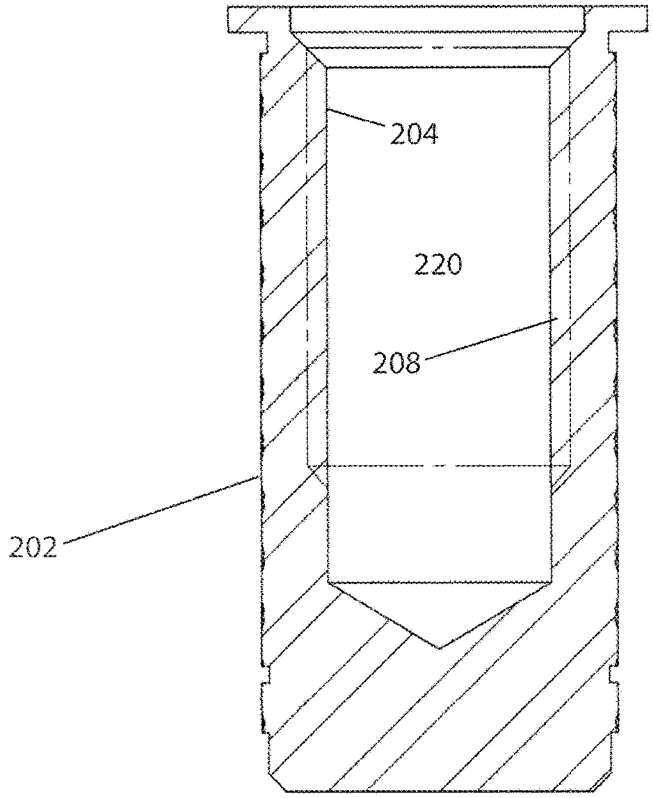

FIGS. 4(*a*) and 4(*b*) depict an embodiment of the floor socket 200 of the present invention. In FIG. 4(*a*), the floor socket 200 generally is a cylindrical shaped insert having an outer wall 202 and an inner wall 204. The floor socket 200 is typically made of a stainless steel but could be made of any suitable material including brass, steel and possibly rubber, PVC or HDPE. The preferred size of the floor socket is ⅞ inch in diameter by 1⅞ inch depth. The outer wall 202 of the floor socket 200 may have a diamond knurl 205 design. Alternatively, the floor socket 200 may have a beveled design in the outer wall 202. The purpose of having a design in the outer wall 202 of the floor socket 200 is to permit a frictional fit between the socket 200 and the cavity drilled into floor 120 to receive the socket 200. Alternatively, the diamond kurl 205 and beveled design permit a better bond between the socket 200 and the cavity 170 if an adhesive is used.

The socket 200 may be up to 4 inches in depth. The benefit of having a socket approximately 2 inches to 4 inches in depth is that there is less chance of contacting decking rebars, electrical supply lines, plumbing or other utilities running below the surface of the floor. The floor socket 200 is typically installed into a preexisting floor 120. A hole is drilled into the pre-existing floor that is slightly larger size of the floor socket 200. In an alternative embodiment, the floor socket 200 may be coated with an adhesive and inserted into the hole in the floor such that the top surface of the socket 200 is flush with the surface of the floor 120. The installation may take as little as 10 minutes per hole, whereas the installation of the standard removable base designs of the prior art would take more than 60 minutes per hole to install. Installation of the socket includes the following steps:

Lay out socket locations, spacing the centerlines at least 6" less than belt length (ex: 9'6" or less with 10' belt);

Drill ¾" hole 170 approximately 2" deep. A core drill mounted in a stand gives the straightest hole and the cleanest edges for a flush mount socket;

Clean out and dry hole 170;

Inject epoxy into bottom and sides of hole 170;

Insert socket 200 flush with floor (tap with hammer if required); and

Wait for epoxy to cure before installing posts 110.

Alternatively, socket 200 designs may include:

1) Tapered drive pin which would flare out the bottom of the socket 200 when hammered into a hole in the floor;

2) Threaded screw that drives into a tapered hole, thus spreading the bottom of the socket; and 3) Outside slip collar.

Often queue layouts may change over time. Additionally, a vendor may prefer to have more than one queue design installed in an existing space. The smaller diameter hole is less intrusive in those scenarios where the queue layouts may change. Even after the installation of the floor socket is complete, it is still easy to modify a layout. The ⅞ inch socket 200 mounts nearly flush to the ground. The socket 200 may include threads 208 to receive either a pillar 150 that has corresponding threads or a socket cap (FIG. 7(*a*)). The socket 200 does not have to incorporate threads 208 on the interior wall. The floor socket 200 may have a threaded 208 inside wall to receive a thread bolt on the interior wall of the floor socket 200. The floor socket 200 is unobtrusive and can be left in the ground without further floor repairs. The larger sockets have a 3 inch diameter raised flange which is unsightly and becomes a potential tripping hazard. Often times, building owners will want these to be removed and the floors repaired, adding more cost to the system.

Figure 5:
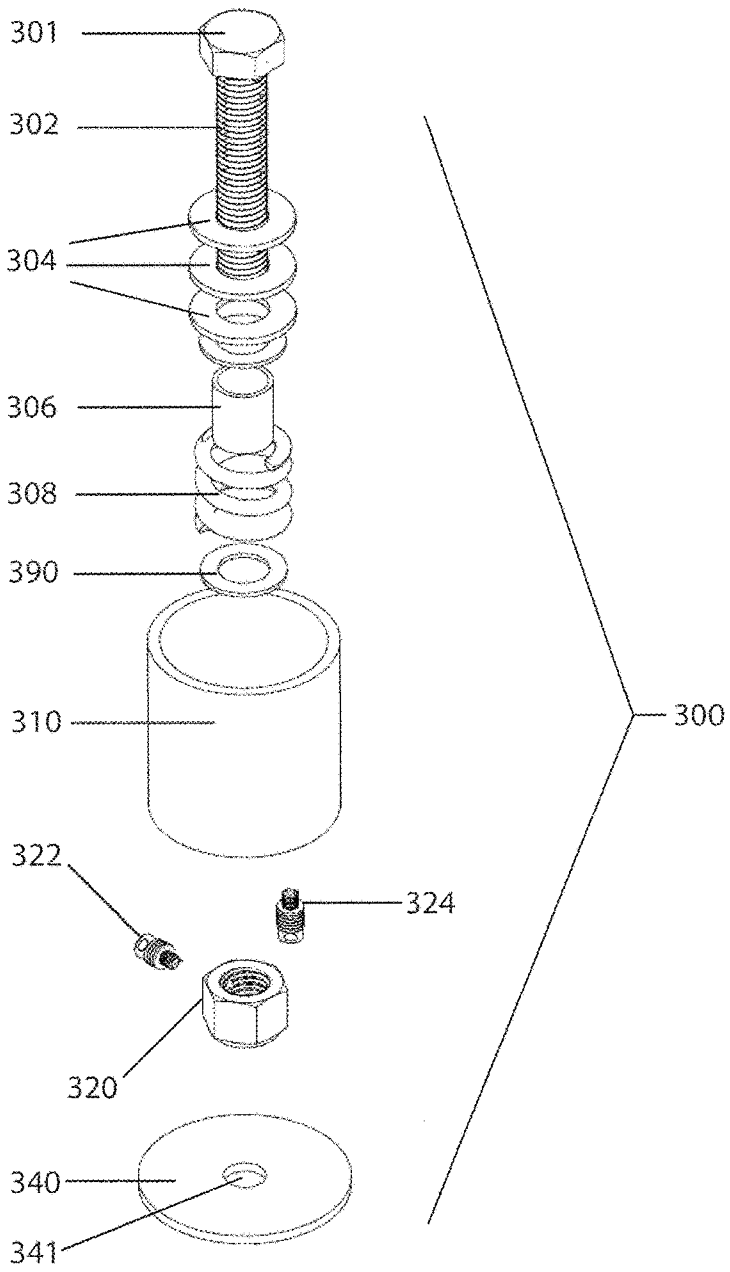
FIG. 5 is a perspective view of the spring loaded base assembly of an embodiment of the present invention.
Figure 6A:
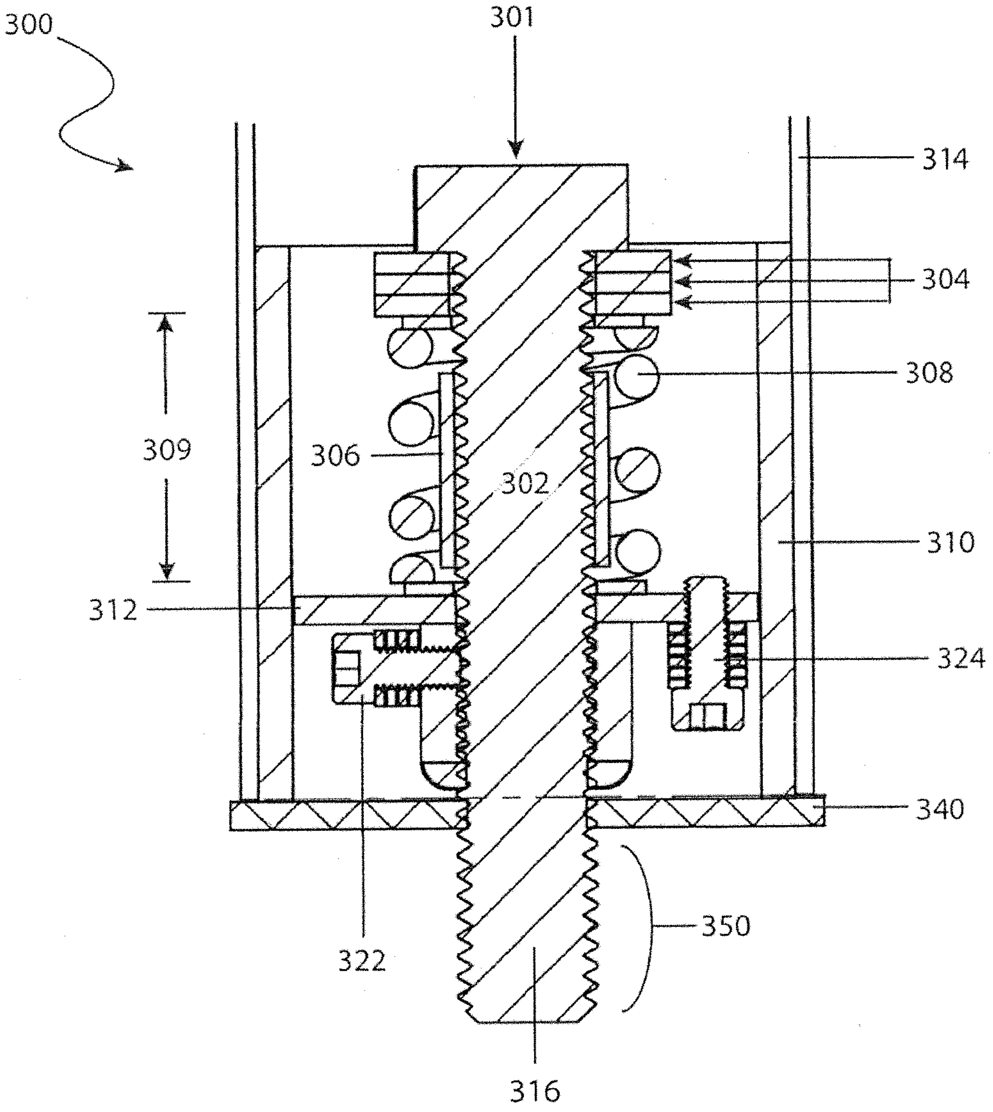
FIG. 6(*a*) is a cross section view of a spring loaded base assembly of an embodiment of the present invention.
Figure 6B:
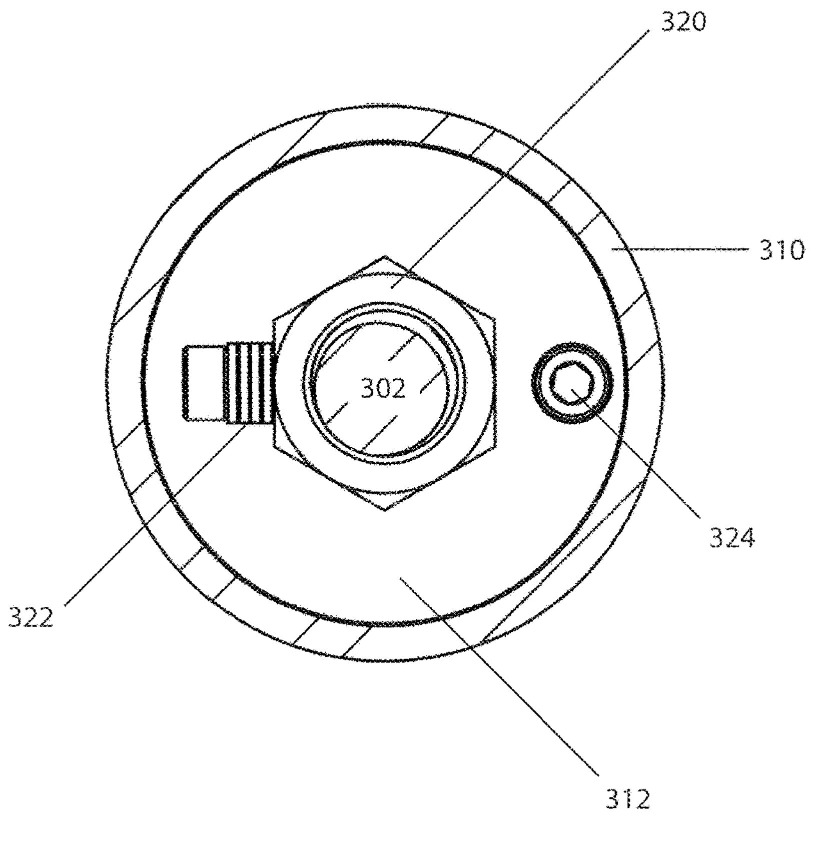

FIGS. 5 and 6 shows the spring-loaded assembly 300 of the preferred embodiment of invention. The spring-loaded assembly 300 may be positioned within the hollow post 114 of the stanchion 110 described in FIGS. 2 and 3. Alternatively, it may be attached to the bottom of the post 114 as an attachment to preexisting post. The preferred embodiment of spring-loaded assembly 300 comprises a hex bolt 302 having threads 303 that supports one or more washers 304. The fully hex bolt 302 has a hexagonal head 301. The fully hex bolt 302 is preferably a ⅝-11×3½ inch threaded bolt. The spring-loaded assembly 300 may include a hollow tube 306 positioned below the 2 inch steel washers 304 on the threads 303 of the hex bolt 302, but it is not necessary. The tubing 306 made of polyethylene but could be made out of any suitable material, such as metal, rubber or the like. Situated outside the tubing 306 is a spring 308. The spring 308 is preferably a compression spring (0.195 wire, 1.5 freeL, 0.945 solid L). The compression may be preloaded 5.5 turns to a set height of 1.0 inches 309. The compression spring 308 is a helical spring member in the preferred embodiment. While a helical spring is described here, there are other types of springs that may be used with this invention. For example, the spring 308 could alternatively be a tension spring, a leaf spring, or torsional spring that creates a tension on the hex bolt 302 to provide angular movement of the post 314 from the vertical position 180. The important feature of the spring 308 is that it places sufficient tension on the post to permit the post 314 to move from the vertical position 180 but limits the range of movement of the post 314. In the current invention, when a force is placed against the post 314, the hex bolt 302 does not move. Instead, one side of the spring 308 is compressed while the opposing side of the spring 308 is expanded. Thus, the post 314 may move from its vertical position until either the spring 308 reaches the maximum compression force rated for a particular spring 308, or the washers 304 contact the inside portion of the cup member 310 or the post 314. In either event, the distance the post may move from its vertical position is limited by the spring assembly 300.

There are embodiments of the current invention that do not require a spring 308. For example, a rubber block may be used in place of a compression spring to add flexibility to the post 114. Also, a series of belleville washers may be utilized in place of a spring 308. The spring may be tensioned to constrain movement of the post 114 to no more than 10 degrees from the vertical position 180. However, the reason for a limitation of movement to no more than 10 degrees from vertical is to prevent accidental snap-back of the post. That is not a requirement of all applications. In fact, in some instances, it may be desirable that the post 114 extend to a substantially parallel position with respect to the floor.

The preferred method of assembly of the spring loaded assembly 300 comprises the steps of selecting the hex bolt 302 and one or more washers onto the hex bolt 302. Next, a washer is made of a thermoplastic material, such as delrin, is placed on the hex bolt 302. A tube 306 surrounded by the helical spring 308 are positioned on the hex bolt 302. A second thermoplastic washer 390 is placed on the hex bolt 302 as the hex bolt 302 is inserted through a hole 341 in the disc member 340.

A nylon lock nut 320 has a pin, tab or set screw 322. The nylon lock nut 320 is tightened until the spring 308 becomes loaded. In the preferred embodiment, a force is applied to the spring 308 by the nylon lock nut 320 at which time the lock nut 320 is turned 5½ turns. At this point, the disc 340 is installed on the shaft 301 such that approximately two to four inches of the hex bolt 302 extends beyond the disc 340. The cup member 310 is mounted to the bottom portion of the post 314. Alternatively, the cup member 310 could be inserted inside a hollow end of the bottom portion 316 of the post 314 and secured to the post 314. Finally, the cup member 310 could be eliminated completely, and the spring would be affixed to the inside wall of the post 314.

The spring-loaded assembly 300 includes a cup member 310. The cup member 310 is a cylindrical hollow H-cup having a flange 312 including a centered hole 311 to receive the threaded hex bolt 302. The flange 312 receives at least a portion of the threaded hex bolt 302, the washers 304 and the compression spring 308. The flange 312 of the cup member 310 has a hole to receive a space screw 324. Alternatively, the flange 312 could be fixed directly to the inside wall of the post 314.

Positioned below the flange portion 312 of the cup member 310 and adjustably affixed to the hex bolt 302 is a nylon lock nut 320. The nylon lock nut 320 includes a hole for receiving a space screw 322 with lock washers. The set screw 322 may be tightened to secure the nylon lock nut 320 to the threaded hex bolt 302. The set screw 322 in the locknut 320 and the set screw 324 in the flange 312 provide for a 350 degree rotation of the post 314 upon installation of the post into the floor 340. The set screws 322 and 324 are positioned such that the two set screws 322 and 324 interfere with the rotational movement of the post 314 and hex bolt 302 upon installation of the post 314. As the finger portion 350 is threaded into the threads 208 of the socket 200, the friction between the threads on the finger portion 350 and the threads 208 of the socket 200 cause the hex bolt 302 to rotate with the set screw 322 until the set screw 322 contacts the second set screw 324. The contact between the set screws 324 and 322 causes the hex bolt 302 to rotate with the post 314, such that the finger 350 is threaded into the socket 200. Once the disc 340 contacts the floor 340, the post 314 will cease rotation due to contact between the set screws 322 and 324. Rotation of the post 314 can then be reversed to back out from the pillar socket 200 up to a 350 degree rotation at which point the set screws 322 and 324 again contact each other. The 350 degree of rotation is important because it permits the cap 130 of the post 110 to be aligned with the cap 130 of another post. The coupling 132 of one post 110 may be aligned with coupling 133 and retractable belt 134 of a second post 110 to form a queue as shown in FIG. 2. While the preferred embodiment uses set screws 324 and 322; tab, pins, notches or the like could be used in place of the set screws 322 and 324.

There is a base disc 340 that has a hole with threads 341. The disc 340 is threaded onto the threads 303 of the hex bolt. The base cap 340 serves two purposes: (1) it prevents the cup member 310 and post 314 from scratching the floor 120 and (2) it protects the inner elements of the spring-loaded assembly 300. There is a portion of the bottom of the threaded hex bolt 302 that extends beyond the disc 340. The finger 350 may be threaded 330 as shown in FIGS. 5 and 6. Alternatively, the finger 350 may not have threads. The threaded portion of the finger 350 mate with the threaded inside portion 208 of the socket 200 such that the finger 350 may be securely fastened 350 to the socket 200 by rotating the post 114 such that the bottom disc 341 meets the floor 120.

The spring-loaded assembly 300 permits the post 314 to lean approximately 10 from the vertical position 180. The spring-loaded assembly 300 permits movement of the post 314 in order to absorb impact from contact with the post 314 from carts, or the like, which would impact the force onto the finger 350 engaged with the socket 160. The post 110 may be positioned on the floor 120 by aligning the pillar 316 with the opening 220 of the socket 200. The pillar 316 is inserted into the opening 220 of the socket 200 and adjusted to a vertical position 180. If the pillar 316 is threaded, the pillar 316 is aligned with the threads 208 of the socket 200. The post 314 is rotated such that the threads of the pillar 316 engage the threads 208 of the socket 200. The post 314 is rotated until the disc 340 contacts the floor 120 and the post 314 is in a vertical position 180 at 90 degrees in relation to the plane of the floor 120. The post 314 can be rotated an additional plus or minus 350 degrees from the point the disc 340 contacts the floor 120 to align the belts on the retractable member 130 or to change the queue configuration. To remove the stanchion from the socket 200, the post 314 is rotated until the threads of the finger 350 are disengaged from the threads of the socket 200.

Figure 7A:
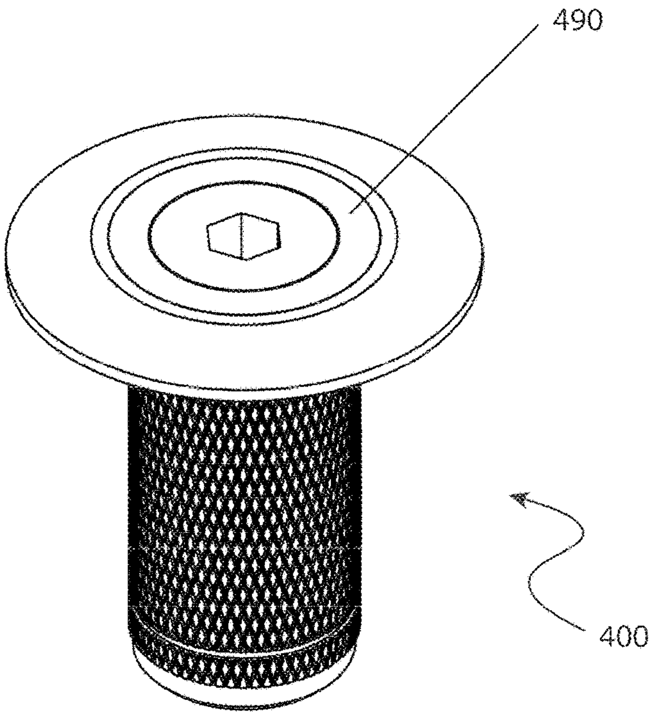
FIG. 7(*a*) is a perspective view of an alternative mini socket with a flange and cap.
Figure 7B:
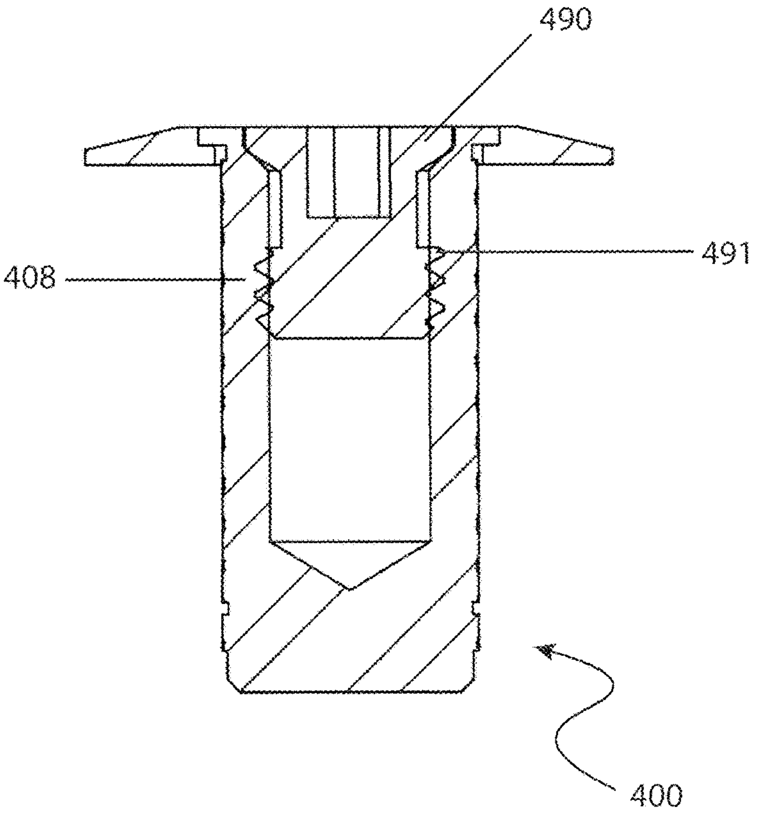

If desired, a cap 490, may be secured to the socket 400 by engaging the threads 491 of the cap 490 with the threads 408 of the socket 400 as shown in FIGS. 7(*a*) and 7(*b*). One benefit of the design of the preferred embodiment is that the cap 490 may be threaded into socket 200. Other larger sockets just have slip fit caps which can easily be removed with no tools. The preferred embodiment requires a maintenance person to use a key (in our case an Allen key) to lock the cap 490 into place.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A floor mountable post assembly comprising:

a post having a hollow base portion;

a spring mechanism engaged with said hollow portion of the post;

the spring mechanism including a pillar, the pillar having a finger extending from the hollow base portion of the post;

a socket engageable with the finger of the spring mechanism, the socket mountable in a floor;

wherein the spring mechanism provides for the hollow post to angularly flex relative to a vertical orientation of the post when the finger is positioned in the socket; and a restriction device that permits 350 degrees negative rotation of the post when the finger is fully threaded into the socket.

2. The floor mountable post assembly of claim 1 wherein the restriction device comprises a first lock member positioned on said spring mechanism and a second lock member secured to the post, and one of said lock members impedes rotational movement of the pillar.

* * * * *